United States Patent [19]
Morse

[11] 3,800,838
[45] Apr. 2, 1974

[54] ASSEMBLY FOR CONVERTING A DRILL PRESS TO A CIRCULAR SAW

[76] Inventor: Glenn B. Morse, 321 Fountain N.E., Grand Rapids, Mich. 49503

[22] Filed: Aug. 28, 1972

[21] Appl. No.: 284,424

[52] U.S. Cl............... 144/1 C, 144/35 A, 83/477.2, 83/478, 83/698, 408/20
[51] Int. Cl............................................. B27c 1/14
[58] Field of Search...................... 83/478, 544–546, 83/698, 477.2, 698; 144/35 A, 1 R, 1 C, 1 G, 1 J, 1 H; 248/12, 13; 408/20

[56] References Cited
UNITED STATES PATENTS

| | | |
|---|---|---|
| 3,709,622 | 1/1973 | Morse............................. 144/1 C X |
| 2,963,057 | 12/1960 | Morse................................. 144/1 C |
| 3,060,979 | 10/1962 | Hanvin............................... 83/477.2 |
| 2,822,836 | 2/1958 | Horstmann et al........... 144/35 A X |
| 2,095,330 | 10/1937 | Hedgpeth......................83/478 X |

Primary Examiner—Andrew R. Juhasz
Assistant Examiner—W. D. Bray
Attorney, Agent, or Firm—Glenn B. Morse

[57] ABSTRACT

Attachments are provided to convert a pivotal-column drill press to a circular saw by mounting a work table on the support table of the drill press, installing a saw and arbor in the drill press chuck, and mounting saw guards on an overhanging portion of the work table opposite a slot receiving the saw blade.

4 Claims, 7 Drawing Figures

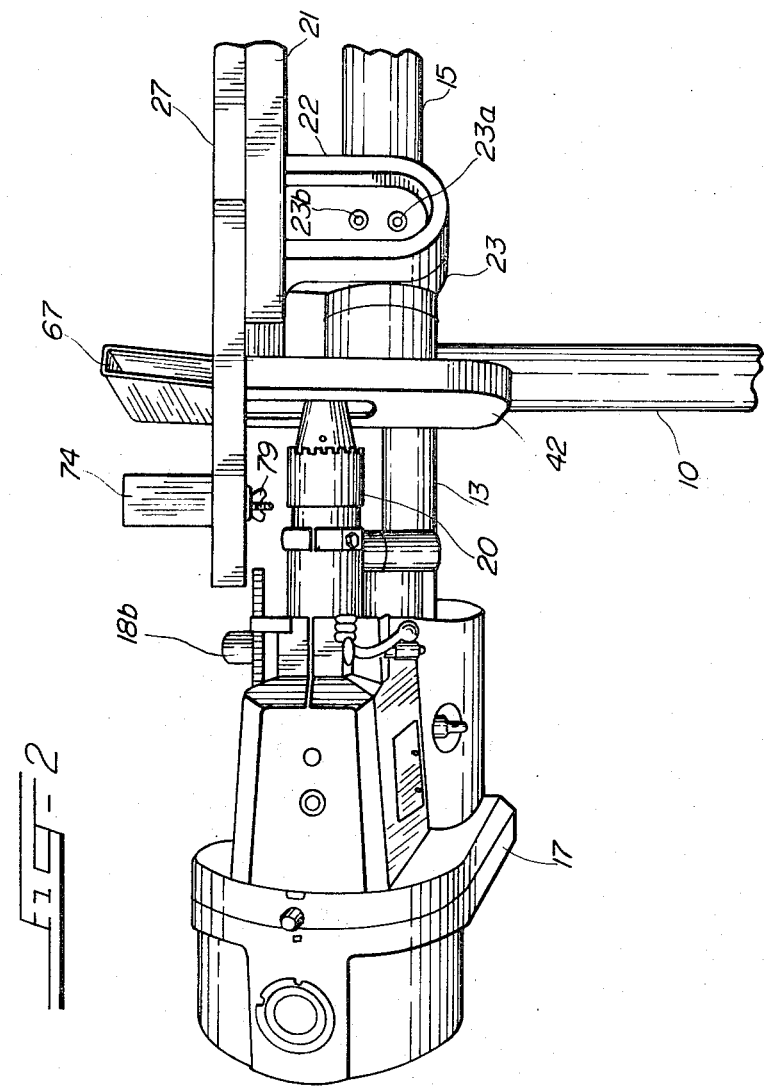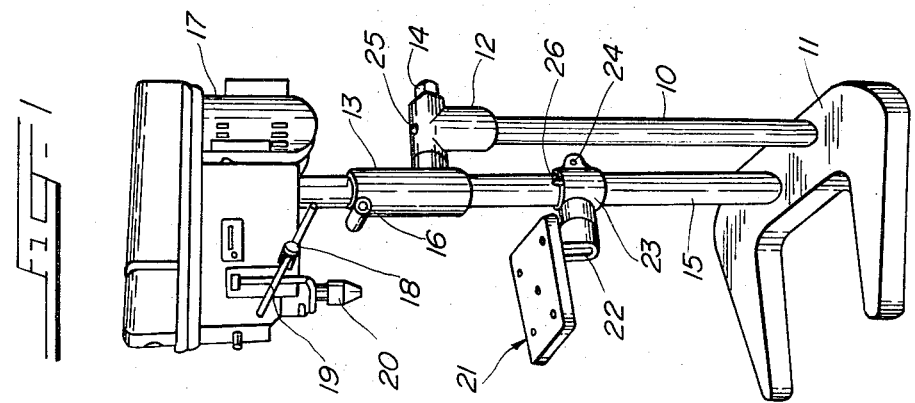

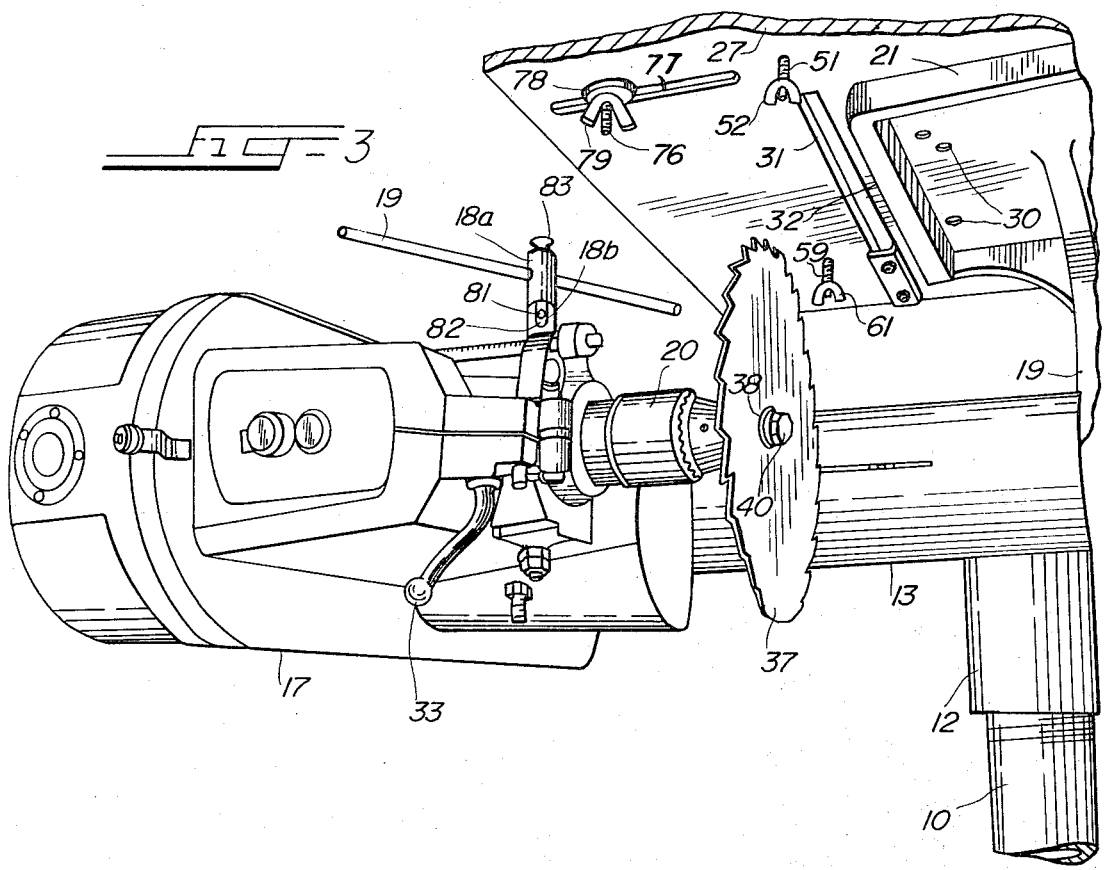
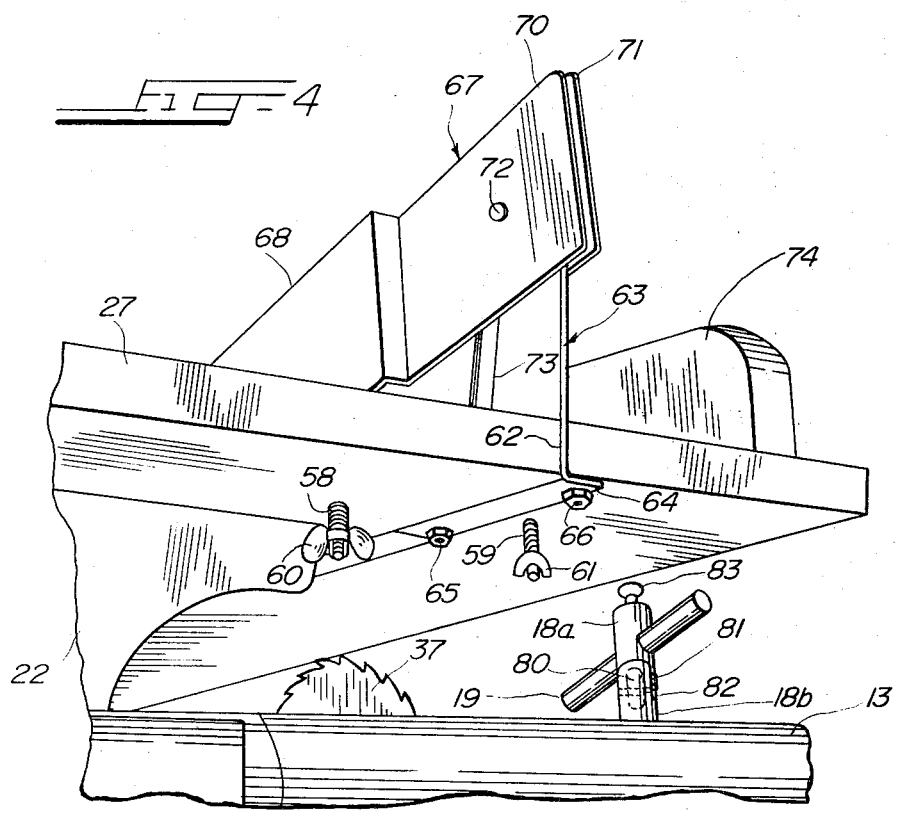

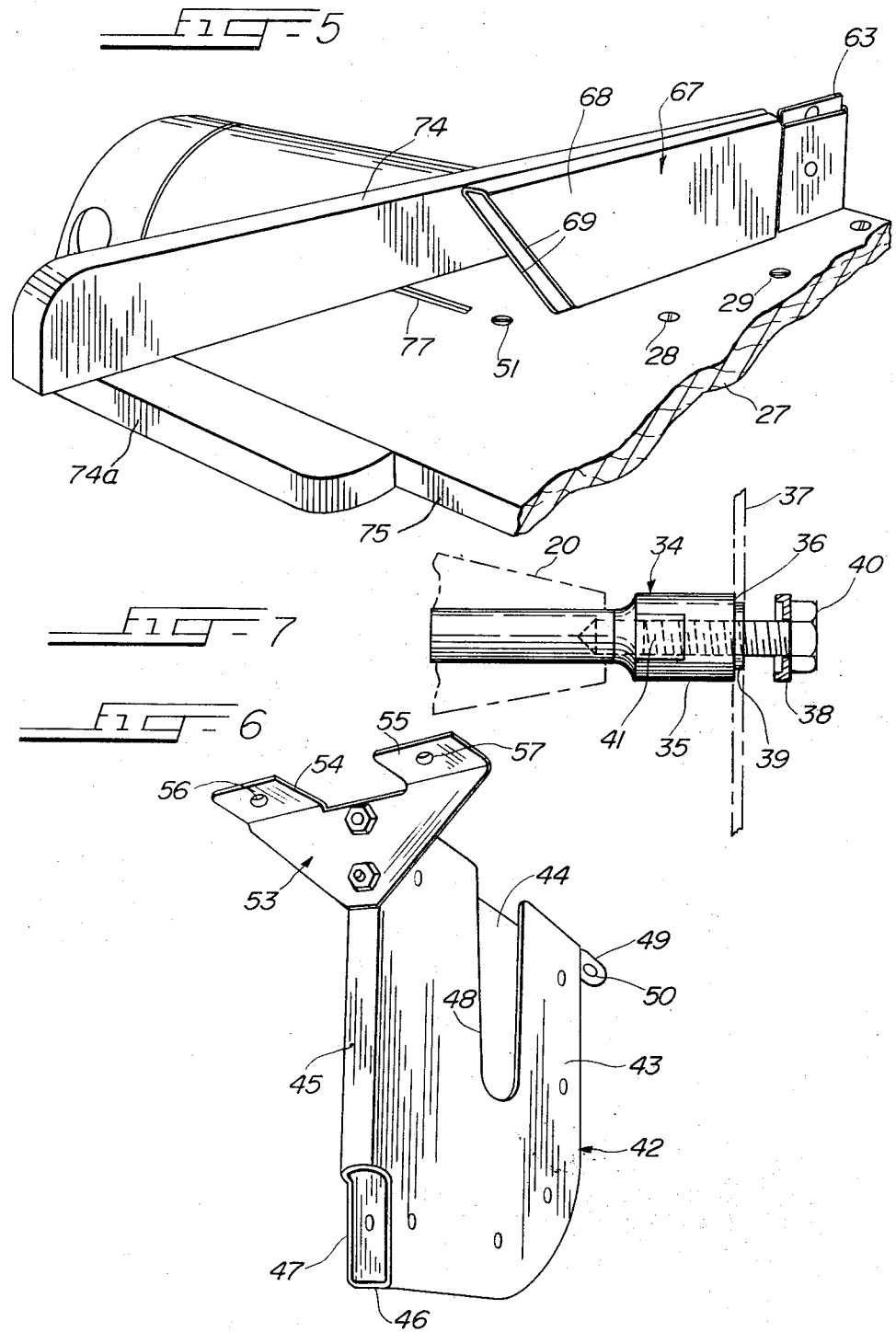

ASSEMBLY FOR CONVERTING A DRILL PRESS TO A CIRCULAR SAW

BACKGROUND OF THE INVENTION

The U.S. Pat. No. 2,963,057 describes a drill press having a pivotal joint in the column, in contrast to the usual fixed column extending from the base directly to the power head. The pivotal arrangement permits the front column (carrying the power head) to be rotated from the vertical to a horizontal position, in which it becomes capable of a variety of functions described in that patent. In one of these, the support table of the drill press is rotated to a horizontal position parallel to the front column, and a circular saw blade is held in an arbor carried by the drill press chuck. The support table of the drill press is used directly as a work table for the resulting circular saw, with the saw projecting through a slot in the drill press table.

This arrangement has resulted in serious problems in providing sufficient safety features to render the assembly usable by relatively unskilled workers. In addition to the usual problems associated with protecting the worker against the portion of the saw blade above the work table, the entirety of the blade below the work table is also exposed. To complicate the matter further, the portion underneath the table is not directly visible to the operator, and it becomes all too easy to have the clothing or his hands engaged with the rotating saw blade. A further problem has been the consequences of accidental disengagement of the arbor from the chuck, or the saw blade from the arbor, which will result in suddenly freeing the spinning saw blade in a position where the continued rotation will tend to induce lateral movement at a tremendous velocity with resulting danger. The installation of appropriate saw guards for the upper and lower portions of the rotating blade have produced design problems which have not had a readily apparent solution. While it is conceivable that a guard structure could be secured to the underside of the table as an item added to the arrangement shown in U.S. Pat. No. 2,963,057, such an arrangement tends to result in the limitation in the usable diameter of the saw blade, and to serious problems in interference when the saw blade must necessarily operate in a position so close to the solid metal forming the drill press table.

Another problem has been the appropriate mounting of a splitter plate (a thin plate which engages the cut made by the saw) so that it can function properly as a support for an upper saw guard assembly. The most desirable point of placement of the splitter support falls in an area outside the dimensions of an ordinary drill press work table, and it is undesirable to provide special table structure for particular attachments of this kind. The relative alignment of the guard components has also proved to be a problem, as it is highly undesirable to require close tolerances in the equipment of this nature, which is necessarily installed and removed by the user on frequent occasions.

SUMMARY OF THE INVENTION

A very practical solution to the above problem has appeared in an assembly in which a panel forming a work table for the circular saw is secured to the drill press support table, and saw guards are mounted opposite a blade-receiving slot in a portion of this work table which overhangs the margin of the drill press support table. This panel forms a unifying frame for a subassembly in which the upper and lower saw guard components are accurately aligned, and are removable from the basic machine as a unit. The table is of a material which is readily cuttable by the saw, which eliminates the danger of possible interference on accidental displacement of the saw from its normal operating position. A modification to the feed mechanism of a conventional drill press is provided to give an extended plane of clearance at the level of the top of the work table, so that large sheets of plywood or other such items can be handled by the saw.

DESCRIPTION OF THE DRAWINGS

FIG. 1 is a perspective view of a drill press having a jointed column assembly, with the front column in the vertical position.

FIG. 2 is a perspective view on an enlarged scale over that of FIG. 1, showing the front column and power head in a horizontal position, and with the components of the circular saw attachment assembly fully installed.

FIG. 3 is a perspective view of an intermediate step in the installation of the circular saw assembly, from the underside of the table. The lower saw guard has been removed, and the saw blade is shown displaced from operating position.

FIG. 4 is a perspective view from the rear and below the installation shown in FIG. 2, on approximately the scale of FIG. 3.

FIG. 5 is a perspective view from the front and above, illustrating the relationship of the table, the upper saw guard, and the guide fence.

FIG. 6 is a rear view of the lower saw guard assembly in perspective.

FIG. 7 is a view of the arbor assembly held in the drill press chuck for the support and placement of the saw blade.

DESCRIPTION OF THE PREFERRED EMBODIMENTS

Referring to FIG. 1, the rear column 10 is fixed to the base 11. The fulcrum member 12 is secured to the top of the fixed rear column 10, and supports a shaft secured to the column-clamping member 13. A nut 14 at the opposite extremity of this shaft can be tightened or loosened to vary the resistance to rotation between the clamping member 13 and the fixed pedestal assembly including the fulcrum member 12, the rear column 10, and the base 11.

The front column 15 is slidably and rotatively received in the clamping member 13, and clamp bolt 16 can be adjusted to constrict the clamp 13 about the column and secure the axial and rotative position of the column with respect to the clamping member 13. The power head assembly indicated generally at 17 is conventional, except for modification of the quill feed shaft 18. This shaft is controlled by the handle 19 to advance the spindle axially so that a drill held in the chuck 20 can advance into the piece being drilled, which is usually supported on the table 21. In the illustrated embodiment, the table 21 has an off-set arm 22 pivotally connected to a table bracket 23 on a conventional bolt 23a, and locked by a locking bolt 23b (refer to FIG. 2). The bracket 23 is rotatively and axially slidable on the column 15 under the control of the clamping bolt 24.

Prior to the installation of the components of the circular saw assembly, the front column 15 is rotated into the horizontal position shown in FIG. 2. It is preferable that the machine be provided with a set-screw 25 in the fulcrum member 12 to engage the pivot shaft, and lock the assembly in the FIG. 2 position. It is also preferable that the table bracket 23 be provided with a coupling pin 26 for engagement with a similarly-shaped recess in the axially opposite end of the clamping member 13 so that the bracket 23, on being moved axially toward the clamping member 13, can become rotatively interengaged with it and thus assure that the table 21 remains in the horizontal position while the power head 17 is free to rotate about the axis of the column 15 when the clamp bolt 16 (and also the clamp bolt 24) are loosened. This coupling system is described and claimed in my application for U.S. patent, Ser. No. 284,417 filed with the present application.

The first step in the installation of the circular saw assembly is the placement of the saw table panel 27 on the top surface of the drill press support table 21. The securing of the panel in position is preferably accomplished through the use of flat-headed screws as shown at 28 and 29 in FIG. 5 traversing the work table 27 and engaging tapped holes as shown at 30 in the drill press support table 21. The heads of these screws are received in the usual beveled recesses so that the working surface of the table 27 is unobstructed. The relative location of the holes receiving the screws 28 and 29, and the tapped holes 30, is such that the saw-receiving slot 31 in the table 27 is in a portion of the table panel overhanging the adjacent edge 32 of the drill press support table 21. With the table panel 27 in this position, the handle 19 of the drill press feed assembly can be actuated (on loosening of the clamp handle 33) to move the spindle assembly carrying the chuck 20 to the right. Prior to making this adjustment, the arbor 34 is installed in the chuck 20. The enlarged portion 35 has a shoulder 36 at the right end, as viewed in FIG. 7, adapted to receive the conventional central opening of the saw blade 37 in closely-fitting relationship. The ring 38 has a central recess capable of fitting over the projection 39 on the arbor to hold the saw 37 securely, regardless of the relative thickness of the saw and the axial length of the projection 39. The bolt 40 traverses the ring 38, and is in threaded engagement with the portion 35 of the arbor. A pair of wrench flats as shown at 41 facilitates holding the arbor in position while the bolt 40 is tightened. When the saw blade 37 has been installed on the arbor assembly, and the arbor in the chuck 20, the handle 19 may be adjusted to place the saw directly opposite the middle of the slot 31 in the work table 27. The clamp handle 33 is then tightened to secure the spindle assembly of the drill press in this position. The clamp bolt 16 in the clamp member 13 is then loosened so that the power head can be swung upward to position the saw blade 37 at the desired vertical position with respect to the top surface of the work table 27. The clamp bolts 16 and 24 are then tightened securely.

Before the machine can be considered safe for use, the lower saw guard unit shown in FIG. 6 should be installed. The housing 42 has the spaced side walls 43 and 44 separated by the peripheral walls 45 and 46. An opening is preferably provided at 47 as a point of discharge for sawdust. The sidewall 43 has a slot 48 capable of receiving the portion 35 of the arbor assembly shown in FIG. 7 in various vertical placements with respect to the surface of the work table 27.

The front of the lower guard assembly is provided with a tab 49 having a hole 50 positioned to receive a bolt 51 traversing the work table 27. The tab 49 is secured preferably by the wing nut 52. The rear portion of the lower-guard is secured with rivets or spot welding to a bridge member 53 provided with spaced bearing feet 54 and 55 having the holes 56 and 57, respectively, disposed to receive the bolts 58 and 59 traversing the work table 27. On tightening of the wing nuts 52, 60, and 61, the lower guard unit is securely held in position. The bridge 53 spans the slot 62 in the table 27 receiving the splitter plate 63, and the effect of the bridge 53 is not only to hold the rear portion of the guard in position, but also to stabilize the portions of the table panel 27 on the opposite side of the slot 62.

The splitter plate 63 has a flange 64 receiving the bolt and nut assembly 64 and 66 traversing the table panel 27 to hold the splitter plate 63 securely in position. This plate has the dual function of (a) maintaining the separation in the work piece on the opposite sides of the saw cut, and (b) supporting the upper saw guard 67. The front portion of this guard straddles the slot 31 in the table 27 which receives the rotating saw blade 37. This forward portion is indicated at 68, and has a U configuration in cross section. The front edges of the legs of U are beveled as shown at 69, so that an oncoming board moving toward the saw will elevate the guard 67 as the board is advanced. The rear portion of the guard 67 is positioned by the presence of the flat portions 70 and 71 on opposite sides of the splitter plate 63. A rivet 72 traverses these flat portions, and also traverses the inclined slot 73 in the splitter plate. This slot is inclined upwardly and rearwardly at approximately 10 degrees from the vertical, which has been established by experiment to produce a very satisfactory raising and lowering movement of the guard 67 as a board passes underneath. This inclination induces the guard to swing downward on top of the surface of the board being sawed at an early stage in the movement of the board through the saw, and also permits the guard to return to the position shown on FIG. 5 after the board has passed beyond the guard assembly. The opposite portions 70 and 71 of the guard 67, together with the rivet 72, are freely slidable with respect to the splitter plate 63, but with a minimum of clearance. The function of the splitter plate, together with the relatively large bearing interengagement between the portions 70 and 71 and the splitter plate, is to stabilize the positions of the guard 67 so that the opposite portions of the forward section 68 rest on the opposite sides of the saw slot 31 in the work table 27.

An alternative installation procedure to the separate installation of the lower guard is to leave the lower guard mounted on the work table. The saw blade 37 can be slipped into the slot 31 from above and the saw secured to the arbor 34 (before or after mounting the arbor in the chuck 20) by manipulating the bolt 40 through an access hole (not shown) in the wall 44 of the lower guard.

The drawings illustrate a very inexpensive form of alignment fence 74 with the T head 74a. When the head 74a is pressed against the edge 75 of the table 27, the fence 74 becomes parallel to the saw blade 37. A bolt 76 engages the underside of the rail 73, and traverses the slot 77 in the table 27. A washer 78 straddles the slot 77, and the wing nut 79 can be tightened to secure the fence 74 in its adjusted position.

Where it is desirable to cut wide materials, such as plywood panels, it is often desirable to remove the fence from the table. This is done simply by unscrewing the wing nut 79, and withdrawing the fence 74 upwardly to the point of disengaging the bolt 76 from the slot 77. The conventional power head assembly of the drill press provides an interference problem due to the fact that the feed shaft 18 controlled by the handle 19 normally traverses the plane of the top of the table 27 in all operating positions of the assembly. It is therefore desirable to provide a disconnectable joint in this shaft at a position below this plane. Referring to FIG. 4, the outer section 18a of the shaft is separated from the inner section 18b at a point which places the outer end of the section 18b below the level of the top of the table 22, as shown in FIG. 2, when the power head is tangent to this plane (by adjustment about the column axis). For this arrangement to provide fully effective clearance, the length of the offset table arm 22 should be such that the top surface of the table 27 is at a distance above the axis of the column 15 which is greater than the minimum distance of the power head from this axis. The outer section 18a is provided with an extension 80 received in a similarly-shaped recess in the end of the section 18b, and bolt 81 traverses both the section 18b and the extension 80. Preferably, a flat area shown at 82 is machined on the outer surface of the section 18b to receive the head of the bolt 81. The thumb nut 83 is conventional, and traverses the section 18a axially to provide a clamping action against the handle 19 so that it can be placed in various positions radially with respect to the axis of rotation of the shaft 18.

I claim:

1. In combination with a machine having a column, a power head secured to said column and having a spindle carrying a chuck and rotatable on an axis parallel to said column, a table bracket adjustably mounted on said column, a table adjustably secured to said bracket, and pivotal support means for said column providing for placement of said column in selected positions between vertical and horizontal, said column being rotatively adjustable about its own axis with respect to said pivotal support means, a circular saw assembly comprising:

a work table having a slot therein;

means securing said work table to said machine table in a position in which said slot is disposed beyond the surface of said machine table on the side thereof adjacent said spindle and parallel to a plane normal to the axis of said spindle with said table disposed with the surface thereof parallel to said axis;

an arbor carried by said chuck;

a circular saw blade mounted on said arbor and normally interengaged with said slot; and a lower saw guard normally secured to said work table and surrounding the portion of said saw blade below said work table.

2. An assembly as defined in claim 1, wherein said machine is a drill press having a shaft operative to move said spindle axially thereof, said shaft extending parallel to a plane normal to the axis of said spindle and traversing the plane of the top of said work table, said shaft having a disconnectable joint below said work table plane when said power head is placed below and adjacent said plane.

3. An assembly as defined in claim 1, additionally including an upper saw guard assembly having a splitter plate, said work table having a second slot, said second slot being in axial alignment with said slot receiving said saw blade and receiving said splitter plate.

4. An assembly as defined in claim 3, additionally including a bridge member normally fixed to said lower saw guard and secured to said table on opposite sides of said second slot.

* * * * *